(12) United States Patent
DeMillo et al.

(10) Patent No.: US 11,106,762 B1
(45) Date of Patent: Aug. 31, 2021

(54) CLOUD-BASED ACCESS TO APPLICATION USAGE

(71) Applicant: A9.com, Seattle, WA (US)

(72) Inventors: Robert DeMillo, Oakland, CA (US); John Isaac Stone, Mountain View, CA (US)

(73) Assignee: A9.com, Seattle, WA (US)

( * ) Notice: Subject to any disclaimer, the term of this patent is extended or adjusted under 35 U.S.C. 154(b) by 254 days.

(21) Appl. No.: 16/104,739

(22) Filed: Aug. 17, 2018

(51) Int. Cl.
*G06Q 20/40* (2012.01)
*G06F 21/10* (2013.01)
*G06F 21/12* (2013.01)
*H04L 29/06* (2006.01)
*G06F 9/455* (2018.01)
*G06F 21/31* (2013.01)
*G06F 9/451* (2018.01)

(52) U.S. Cl.
CPC ........ *G06F 21/105* (2013.01); *G06F 9/45558* (2013.01); *G06F 21/121* (2013.01); *G06F 21/31* (2013.01); *H04L 63/102* (2013.01); *G06F 9/451* (2018.02); *H04L 2463/101* (2013.01)

(58) Field of Classification Search
CPC ........... G06Q 2220/00; G06Q 2220/10; G06Q 2220/18; G06F 21/105; G06F 9/45558; G06F 21/31; G06F 21/121; G06F 9/451; H04L 63/102; H04L 2463/101
USPC ...................................................... 705/61, 21
See application file for complete search history.

(56) References Cited

U.S. PATENT DOCUMENTS

| | | | |
|---|---|---|---|
| 2005/0138074 A1* | 6/2005 | O'Connor | G06Q 10/06 |
| 2010/0125844 A1 | 5/2010 | Mousseau et al. | |
| 2011/0185292 A1 | 7/2011 | Chwala et al. | |
| 2011/0213691 A1 | 9/2011 | Ferris et al. | |
| 2012/0059917 A1 | 3/2012 | Dawson et al. | |
| 2012/0096271 A1 | 4/2012 | Ramarathinam et al. | |
| 2015/0106500 A1* | 4/2015 | Fakhouri | H04L 67/34 709/224 |
| 2017/0109506 A1* | 4/2017 | Shetty | G06F 16/13 |

* cited by examiner

*Primary Examiner* — Dante Ravetti
(74) *Attorney, Agent, or Firm* — Nicholson De Vos Webster & Elliott LLP

(57) ABSTRACT

An application licensing system reduces the computational cost of providing application access to licensees by running instances of licensed applications in virtual machines and providing web-based user interfaces to client devices associated with users of a license pool. An application licensing system onboards one or more licenses for applications licensed by an organization from an application vendor. When a user of the organization wishes to access a licensed application, the application licensing system determines whether the organization's license pool permits the requested use and analyzes current uses of the requested application to determine whether a license is available for use by the user. If the set of application licenses for the organization permits the requested use, the system runs an instance of the application in a virtual machine and provides the user with access to the application through a web-based user interface.

20 Claims, 6 Drawing Sheets

CLOUD-BASED ACCESS TO APPLICATION USAGE

BACKGROUND

This subject matter described generally relates to controlling access to and usage of software, and in particular to cloud-based access to applications within a pool.

Several common issues arise when software users wish to use specialized software applications, such as graphics rendering applications. A number of these applications are narrowly focused and useful to a limited number of technical practitioners or are useful only for specialized projects. Further, many applications are computationally expensive, making it infeasible to run the software from most computing devices (which lack the requisite computing power). The cost of computing devices with sufficient computing power to run these applications, and the infrastructure to support them, may be prohibitive for many organizations, and, if organizations invest in such devices and infrastructure, employees of the organization are confined to using the applications only at the location of the devices.

DETAILED DESCRIPTION

Figure 1:
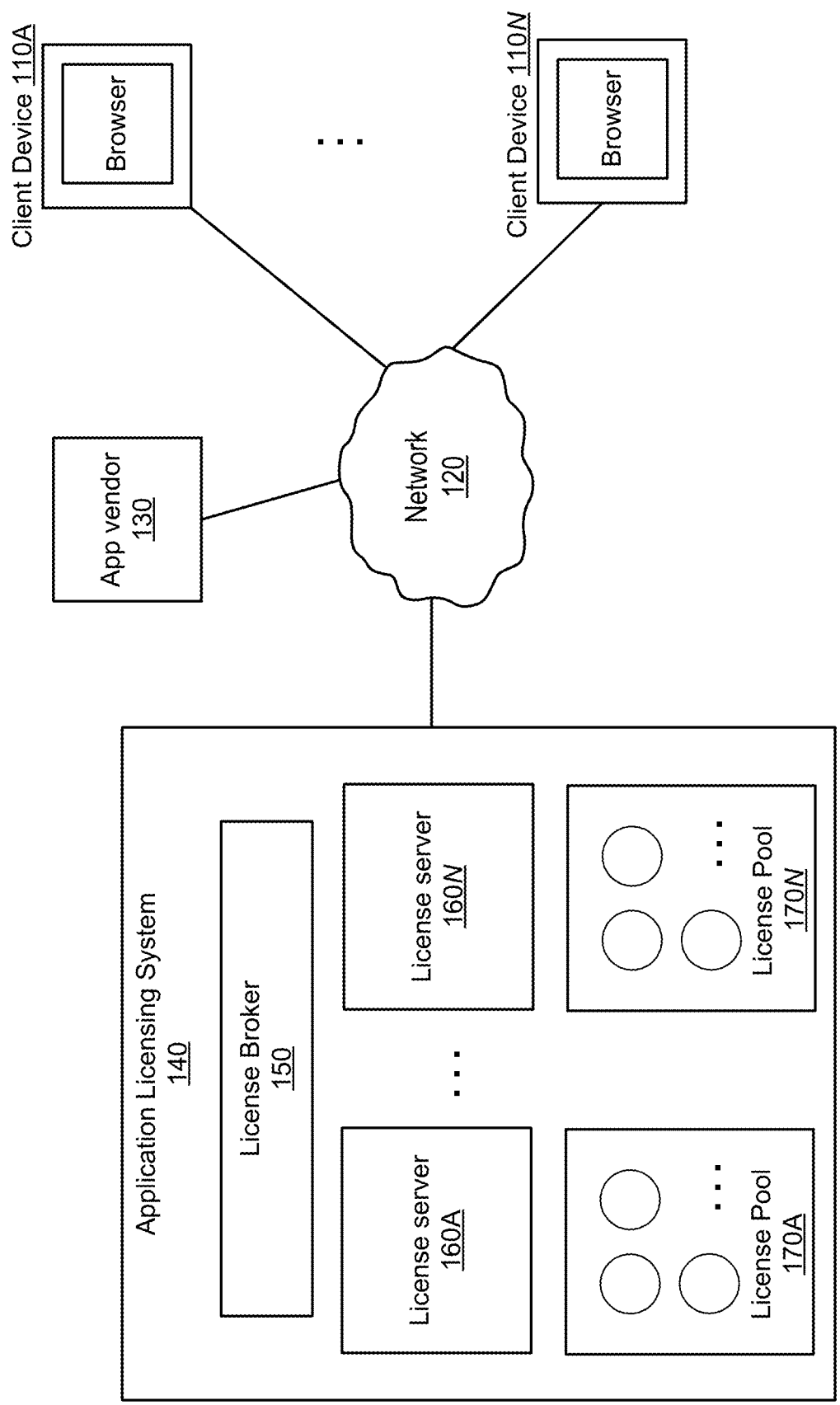
FIG. 1 is a block diagram illustrating a system environment for an application licensing system, according to one embodiment.

The Figures (FIGS.) and the following description describe certain embodiments by way of illustration only. One skilled in the art will readily recognize from the following description that alternative embodiments of the structures and methods may be employed without departing from the principles described. Reference will now be made to several embodiments, examples of which are illustrated in the accompanying figures. It is noted that wherever practicable similar or like reference numbers are used in the figures to indicate similar or like functionality.

OVERVIEW AND BENEFITS

An application licensing system reduces the computational and financial costs of providing application access to licensees by running instances of licensed applications in virtual machines and providing web-based user interfaces to client devices associated with users of a license pool.

The application licensing system onboards one or more licenses for applications licensed by an organization from an application vendor. The organization may be associated with an existing license pool on the application licensing system or may request to create a new license pool through which users of the organization may access licensed applications. License data for the onboarded application is stored in association with the organization, and a license pool for the organization is updated to include the onboarded licenses. License data stored for an application may include an identification of the application, a number of licenses, a software key for the application, and, in some embodiments, rules specifying restrictions on access to or use of the application by one or more users of the organization. The application licensing system also is granted access to a virtualized machine containing a copy of the licensed application, and grants that application access to the application licensing system to prove authorization by a requesting user.

When a user of the organization wishes to access a licensed application, the application licensing system authenticates the licensed application using a virtualized form of the native licensing method of the application. For example, in some embodiments this licensing takes the form of a web-based user interface on a browser of the client device through which the user is prompted to enter credentials to log the user in to the application. Alternatively, in other embodiments the application licensing system references a stored license key in the profile of the user or the associated organization to log the user into the application, or compares the user credentials to a virtualized hardware dongle to allow the user to access the application. If the user is authenticated as being associated with an organization having a license pool on the application licensing system, the user is presented with a list of available applications that the user is permitted to access through the organization's license pool. Responsive to the user selecting an application, the application licensing system identifies current uses of licenses for the application to determine whether a license is available for use by the requesting user. If the application licensing system determines that the set of application licenses for the organization permits the requested use, the application licensing system runs an instance of the application in a virtual machine and provides the client device with access to the application through a web-based user interface.

Example Systems

FIG. 1 illustrates one embodiment of a system environment 100 for an application licensing system 140, according to one embodiment. The system environment 100 shown by FIG. 1 comprises a plurality of client devices 110A-110N, a network 120, an application vendor 130, and the application licensing system 140. In alternative configurations, different and/or additional components may be included in the system environment 100. In addition, the functions may be distributed among the elements in a different manner than described.

FIG. 1 uses like reference numerals to identify like elements. A letter after a reference numeral, such as "110A" indicates that the text refers specifically to the element having that particular reference numeral. A reference numeral in the text without a following letter, such as "110," refers to any or all of the elements in the figures bearing that reference numeral. For example, "110" in the text refers to reference numerals "110A" and/or "110N" in the figures.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the application licensing system 140. For example, a client device 110 executes a browser application to enable interaction between the client device 110 and the application licensing system 140 via the network 120. In another embodiment, a client device 110 interacts with the application licensing system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more application vendors 130 may be coupled to the network 120 for communicating with the application licensing system 140. In one embodiment, the application vendor 130 communicates to the application licensing system 140 information describing applications for execution, which the application licensing system executes on a virtual machine. In other embodiments, the application vendor 130 provides the application to the application licensing system 140 for execution by a client device 110 or an application executing on the client device 110. Users of the client devices 110 may be associated with organizations (e.g., employers) that may purchase application licenses from the application vendors 130 and receive software license keys that enable the applications to execute on the client devices 110 of the employee users. The users provide the received license keys to the application licensing system 140, which allows the application licensing system to execute the applications on behalf of the users. The application onboarding process is discussed in more detail below with respect to FIG. 3.

The application licensing system 140 manages the onboarding of application licenses from application vendors 130 and organizations that have licensed applications, and the use of licenses by authenticated users requesting access to a licensed application. The application licensing system 140 typically includes one or more physical server computers with one or more physical storage devices and databases as well as various processing engines. In particular, in the embodiment shown in FIG. 1, the application licensing system 140 includes a license broker 150, a plurality of license servers 160A-160N, and a license pool 170 for each license server. In some embodiments, the application licensing system 140 provides access to the licensed applications by executing the applications on virtual machines and providing remote access, e.g., via a web-based interface.

The license broker 150 may include one or more server devices, or other types of computation or communication devices, that gather, process, search, and/or provide information in a manner described herein. For example, in one embodiment, the license broker 150 onboards application licenses from an organization through a client device 110 or directly from an application vendor 130. Licensed applications are run in a virtual machine executing on the license servers 160 and provided to a requesting user through a web-based user interface. In some embodiments the license broker 150 includes an onboarding module 210, a license usage module 220, a front-end module 205, a permissions module 215, a license database 225, and a permissions database 230, which are explained in more detail below with respect to FIG. 2.

The license servers 160A-N run instances of the licensed applications. In one embodiment, each application vendor 130 is associated with its own license server 160 on the application licensing system 140. The license servers 160 may be accessed via a private network, such as a LAN, a company intranet, or other type of private network. In one embodiment, the application licensing system 140 runs application rendering operations on the license servers 160 via rendering software and provides the client device 110 with a web-based user interface of the application.

In some embodiments, each application server 160A-N is associated with a license pool 170A-N, which each contain application licenses grouped into sets based on organizations. Alternatively, groups of licenses may be organized into a single license pool 170 on the application licensing system 140. In still other embodiments, the application licensing system 140 includes shared license pools 170 in which sets of licenses for multiple organizations are grouped together.

The license pool 170 for an organization is a pool of onboarded licenses for applications used by the organization. For example, the onboarded licenses may include a license for a rendering application used by members of the organization. When the license broker 150 onboards a license for the rendering application from a client device 110 associated with the organization, the license broker 150 provides the license to the license pool 170 for the organization such that the license is available for user by users associated with the organization. In other embodiments, the application vendor 130 provides a set of application licenses to the application licensing system 140 that are stored in the license pool 170 associated with the organization. As discussed in more detail below with respect to FIG. 2, upon a request to use a rendering application, the licensing broker 150 determines whether the corresponding license pool 170 contains one or more unused licenses for the rendering application, and, if the license pool contains an available license, instructs a license server 160 to run the requested application on a virtual machine and provide a web-based user interface to the requesting user through the client device 110.

In one embodiment, the application is a graphics application that allows a user to manipulate graphics and is associated with a rendering application that schedules rendering operations based on the graphics manipulations. Licenses for the graphics and rendering applications may be provided by a single application vendor 130 or by multiple application vendors 130 and are stored in association with one or more license pools 170. If a user requests access to both applications, the license broker 150 determines current uses of licenses for the applications. If a license for each requested application is available for use by the user, the license broker 150 provides application access through a web-based user interface. Conversely, if at least one of the requested licenses is unavailable (e.g., all available licenses are in use by other users), the license broker 150 notifies the user of the unavailability and, in some embodiments, provides an estimated time until both requested licenses are available.

Figure 2:
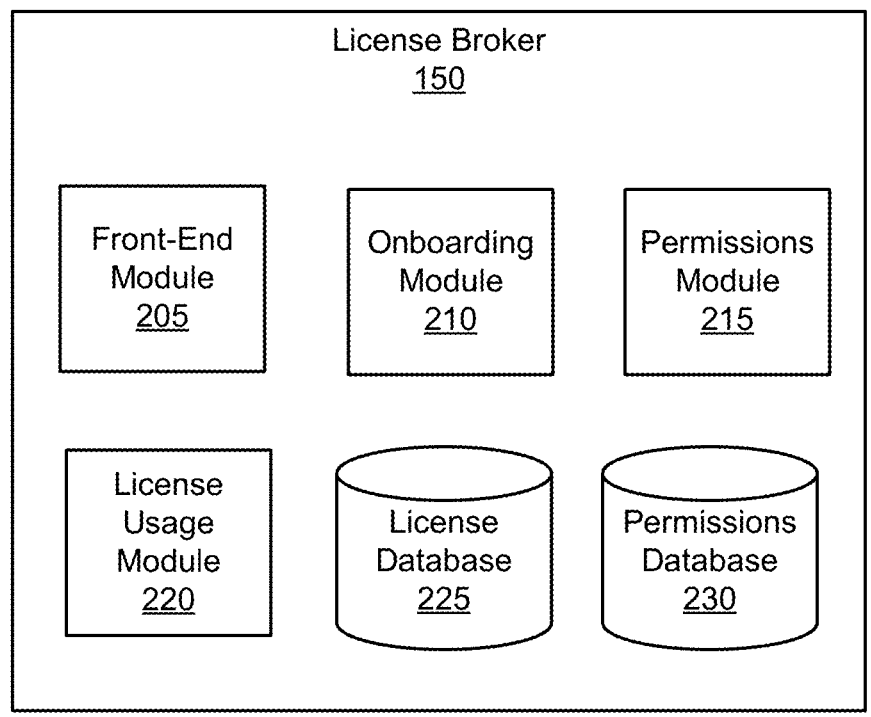
FIG. 2 is a block diagram illustrating an application licensing system, according to one embodiment.

FIG. 2 is a block diagram of an architecture of the application licensing system 140, according to one embodiment. The application licensing system 140 shown in FIG. 2 includes a front-end module 205, an onboarding module 210, a permissions module 215, a license usage module 220, a license database 225, and a permissions database 230. In other embodiments, the application licensing system 140 may include additional, fewer, or different components for various applications. Conventional components such as network interfaces, security functions, load balancers, failover servers, management and network operations consoles, and the like are not shown so as to not obscure the details of the system architecture.

The front end-module 215 facilitates communication between the application licensing system 140, the application vendor 130, and the client devices 110 associated with users and organizations. In one embodiment, application vendors 130 interact with the application licensing system 140 through the front-end module 205 to provide applications for onboarding and/or to validate the use of licensed applications by members of an organization. Similarly, client devices 110 submit requests to access licensed applications through the front-end module 205.

Responsive to receiving a request from an organization to onboard one or more applications for which the organization has obtained licenses from the application vendors 130, the front-end module 205 instructs the onboarding module 210 to process the application submission. The onboarding module 210 onboards information about the applications from the client device 110 associated with the organization. For example, the onboarding information might include an identification of the applications, a number of licenses, license expiration dates, associated users of the organization that are permitted to access the applications, and one or more software license keys associated with the licenses. The information might further include conditions or restrictions on use of the licenses by one or more users, the physical location of the user, and projects associated with each organization of which the user is a member. Still further, the onboarding information might include the position that a user has on a specific project and associated access controls. For example, the user might be (1) an administrator with full access control, including the ability to add/delete users and data across all projects under control of an organization and to add/delete licenses from an organization's license pool 170, (2) a manager with partial access control, including the ability to see all work in all user contributions to specific projects, to add/delete users and data for a specific project, and to allow access to/from licenses for individual users, but with no ability to add/delete licenses from a license pool 170, or (3) a creator/project contributor with the ability to add/delete his or her specific data but without administrative control. In other embodiments, application licenses for onboarding to the application licensing system 140 are provided directly by the application vendor 130. Application information received from the organization or application vendor 130 is sent to the license database 225 for storage. The onboarding module 210 also receives a copy of the application from the client device 110 or application vendor 130. In one embodiment, the application copy is stored on a virtual machine associated with the application licensing system 140.

The onboarding module 210 stores the onboarded licenses in the license database 225 and updates a license count for the licensed application to reflect the onboarded licenses, e.g., a count of 10 reflecting 10 licenses for that application. In one embodiment, the onboarding module 210 determines whether the licenses are associated with one or more license pools 170 on the application licensing system 140. If so, the onboarding module 210 instructs the license usage module 220 to update the license pool 170 with a license count and any conditions associated with the new application licenses, which are stored in the permissions database 230.

The permissions module 215 processes user requests to access licensed applications on the application licensing system 140. In one embodiment, a user wishing to access an application accesses the application licensing system 140 through a web-based user interface on a browser of the client device 110. The front-end module 205 prompts the user to provide the user's credentials to verify that the user has access to the application licensing system 140. In one embodiment, the credentials include the user's username/password, an identifier of the user's account, and/or an identification of an organization with which the user is associated. In some embodiments, the credentials further include an identification of the application that the user wishes to access. The front-end module 205 sends the credentials to the permissions module 215 for verification. The permissions module 215 grants permission by verifying that the account is valid and current, that the user has provided correct password credentials, that the requested license is active (e.g., has not expired or been revoked), and that the user is associated with one or more license pools 170 (e.g., via an organization to which the user belongs) that permit the user to access one or more licensed applications. In one embodiment, the permissions module 215 compares the user credentials with authentication information stored in the permissions database 230 to determine whether to verify the user's access to the application licensing system 140. The permissions module 215 then returns a response to the front-end module 205 specifying whether the user was successfully authenticated. The response optionally includes any restrictions on the user's ability to access one or more licenses in a license pool 170 associated with the user's account or organization. For example, license parameters for a user might specify that the user is permitted to access a first application in the organization's license pool 170 but is not permitted to access a second application or has limited usage rights to the second application.

If the authentication was successful, the permissions module 215 notifies the license usage module 220 to determine whether one or more licenses are available for the requested application. In embodiments where the user credentials did not include a request to access a specific application, the permissions module 215 notifies the front-end module 205, which displays a list of titles or icons of available applications that the user is permitted to access or otherwise prompts the user to specify one or more applications that the user wishes to access. The list of available applications is displayed on a web-based user interface associated with the application licensing system 140 on a browser of the client device 110. Responsive to receiving an application selection from the client device 110, the front-end module 205 notifies the license usage module 220 of the requested application.

The license usage module 220 tracks usage of the licensed applications by users of the application licensing system 140. Responsive to receiving a request from a user to access an application and determining that the user is permitted to access the requested application, the license usage module 220 queries the license database 225 to determine current uses of licenses for the requested application. For example, a license pool 170 might include ten licenses to a graphics application for use by members of a first organization. If a user requests access to the graphics application, the license usage module 220 queries the license database 225 to determine whether at least one license of the ten licenses in the license pool 170 is available for use by the requesting user. The license database 225 returns the availability information to the license usage module 220.

If a license for the requested application is not available (i.e., all of the licenses for the application are in use by other members of the organization associated with the license pool 170), the license usage module 220 notifies the front-end module 205, which sends a message to the requesting user through the client device 110 to inform the user that there are no available licenses for the application. In some embodiments, the front-end module 205 provides an option for the user to be notified when a license for the requested application becomes available (e.g., if an additional license for the application is added to the license pool 170 or an in-use license is surrendered by another user). In instances where a user requests access to multiple licenses (i.e., if the user wishes to access multiple applications at once), the license usage module 220 queries the license database 225 for current uses of the requested licenses to determine whether the applications are available for use by the requesting user. If at least one of the requested licenses is unavailable, the front-end module 205 notifies the user and, in some embodiments, provides an estimated time until the requested licenses are available based on tracking prior frequencies of requesting and releasing licenses for the corresponding application(s).

If a license for the requested application is available, the license usage module 220 further queries the permissions database 230 to determine whether any restrictions limit the user's use of the application. For example, a user may have permission to access some components of an application (e.g., a plug-in), but not others, or may have permission to access the application for a limited period of time or on specific days (e.g., the user is permitted to access the application on Mondays, Wednesdays, and Fridays, but not on the remaining days of the week).

The license usage module 220 instructs the front-end module 205 to notify the user of the available license and notifies the license database 225 that the license is in use, prompting the license database 225 to update the number of available licenses for the application. In one embodiment, the license usage module 220 further instructs a license server 160 associated with the requested application to run an instance of the application in a virtual machine and to provide a web-based user interface for the application to the client device 110, subject to any restrictions on the user's use of the application. For example, while a user might have access to a third-party application through the application licensing system 140, some components of the application, such as plug-ins, might require a separate license, and might therefore be indicated as unavailable within the application user interface a separate license has not been obtained.

Responsive to the user surrendering the application license or the application usage otherwise terminating (e.g., as a result of a time limit on the user's use of the application), the license usage module 220 instructs the license server 160 to stop running the instance of the application and to close the web-based user interface provided to the client device 110. The available license count is updated in the license database 225 such that the application license is available for other users associated with the license pool 170.

In some embodiments, the application vendor 130 might instruct the application licensing system 140 to offboard a previously ingested license associated with one or more license pools 170 (e.g., if the application license has expired or if the application vendor 130 revokes the license). Responsive to the application vendor 130 providing offboarding instructions to the application licensing system 140 through the front-end module 205, the license broker 150 deactivates the license (e.g., by removing the license from one or more license pools 170 associated with the offboarding instructions or otherwise updating the license pools 170 to reflect that the license is unavailable). In some embodiments, the application for which the license was offboarded itself remains stored on the virtual machine, even when licenses to it are removed. If a user of a client device 110 requests access to an application for which the license has been offboarded, the front-end module 205 notifies the user that the available licenses in the license pool 170 do not support running the requested application. Thereafter, the user can again install and use the application from an individual computing device, rather than from the application licensing system 140.

Example License Onboarding Method

Figure 3:
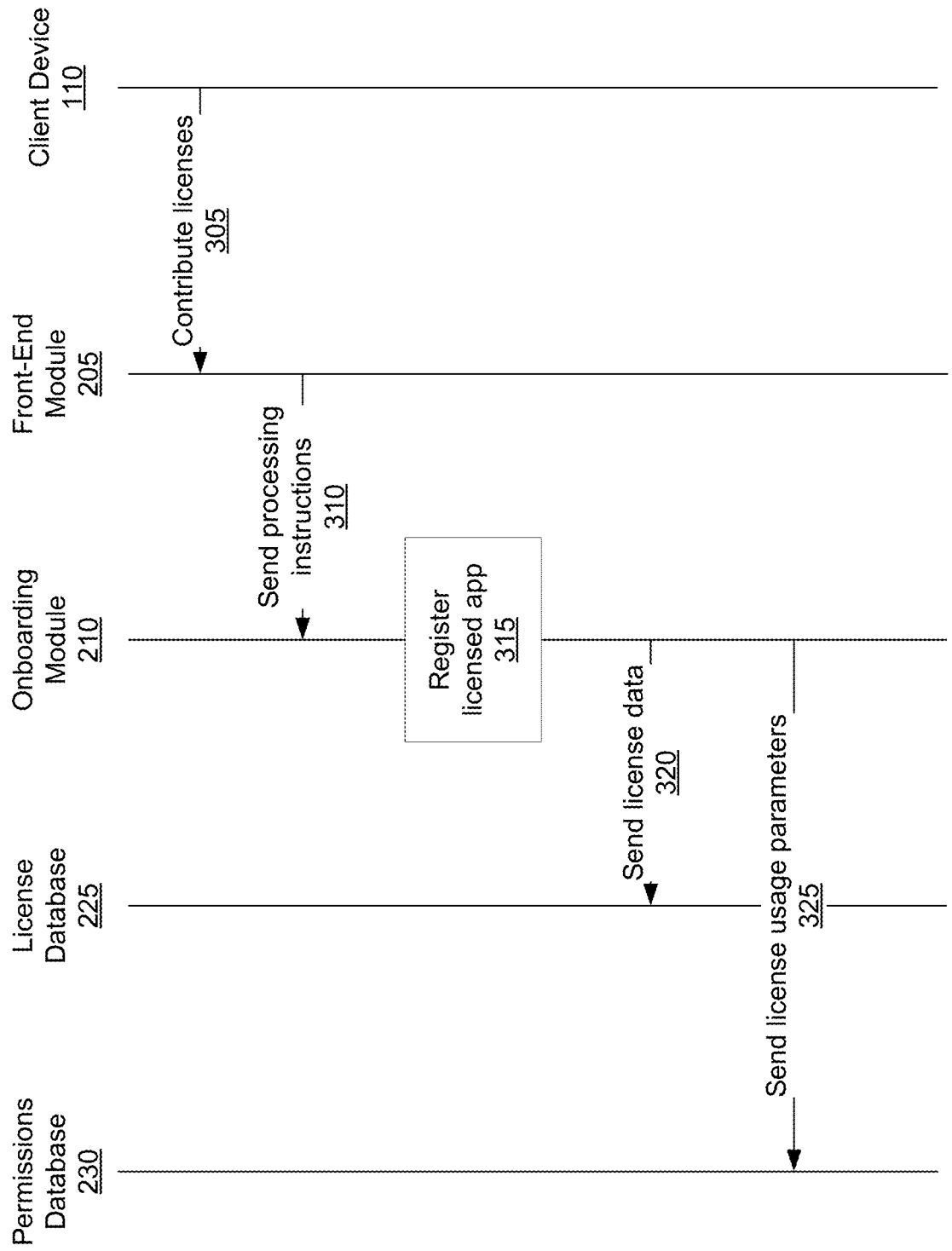
FIG. 3 is an interaction diagram illustrating a method for preliminary license onboarding, according to one embodiment.

FIG. 3 illustrates a method 300 for onboarding an application license from an organization associated with a client device 110, according to one embodiment. The steps of FIG. 3 are illustrated from the perspective of the license broker 150 performing the method 300. However, some or all of the steps may be performed by other entities or components. In addition, some embodiments may perform the steps in parallel, perform the steps in different orders, or perform different steps. Further, in some embodiments, requests to onboard applications are received directly from the application vendor 130.

At 305, a client device 110 associated with an organization submits to the application licensing system 140 a request to onboard one or more applications for use by users of the organization. The client device 110 contributes 305 through the front-end module 205 application data such as an identification of the application, an identification of the license pool 170 associated with the organization, a number of licenses and corresponding license expiration dates, users of the organization that are authorized to access the application, one or more software license keys associated with the application and, in some embodiments, restrictions on use of the license by one or more users.

The front-end module 205 receives the application data and sends 310 processing instructions to the onboarding module 210, instructing the onboarding module 210 to onboard the licensed application. The onboarding module 210 registers 315 the onboarded application by updating the license pool 170 associated with the organization to include licenses for the application, increasing the license count by the number of obtained licenses. The onboarding module 210 also onboards a copy of the application and stores the application on a virtual machine associated with the application licensing system 140.

At 320, the onboarding module 210 sends application license data for the onboarded application to the license database 225 for storage. License usage parameters governing conditions of use of the licensed applications by one or more users associated with the license pool 170 (if any) are sent 325 for storage in the permissions database 230.

Some applications verify at time of installation that there is a valid license for the application. In these cases, the installation code for the application sends a stored license key associated with the onboarded application to the application vendor 130 to verify that the stored license key matches the license key stored by the application vendor 130 and is thus valid. For other applications, verification may occur at different times, such as at application run time or after a specified period of time or specified number of application usage instances.

Example Runtime Usage Method

Figure 4:
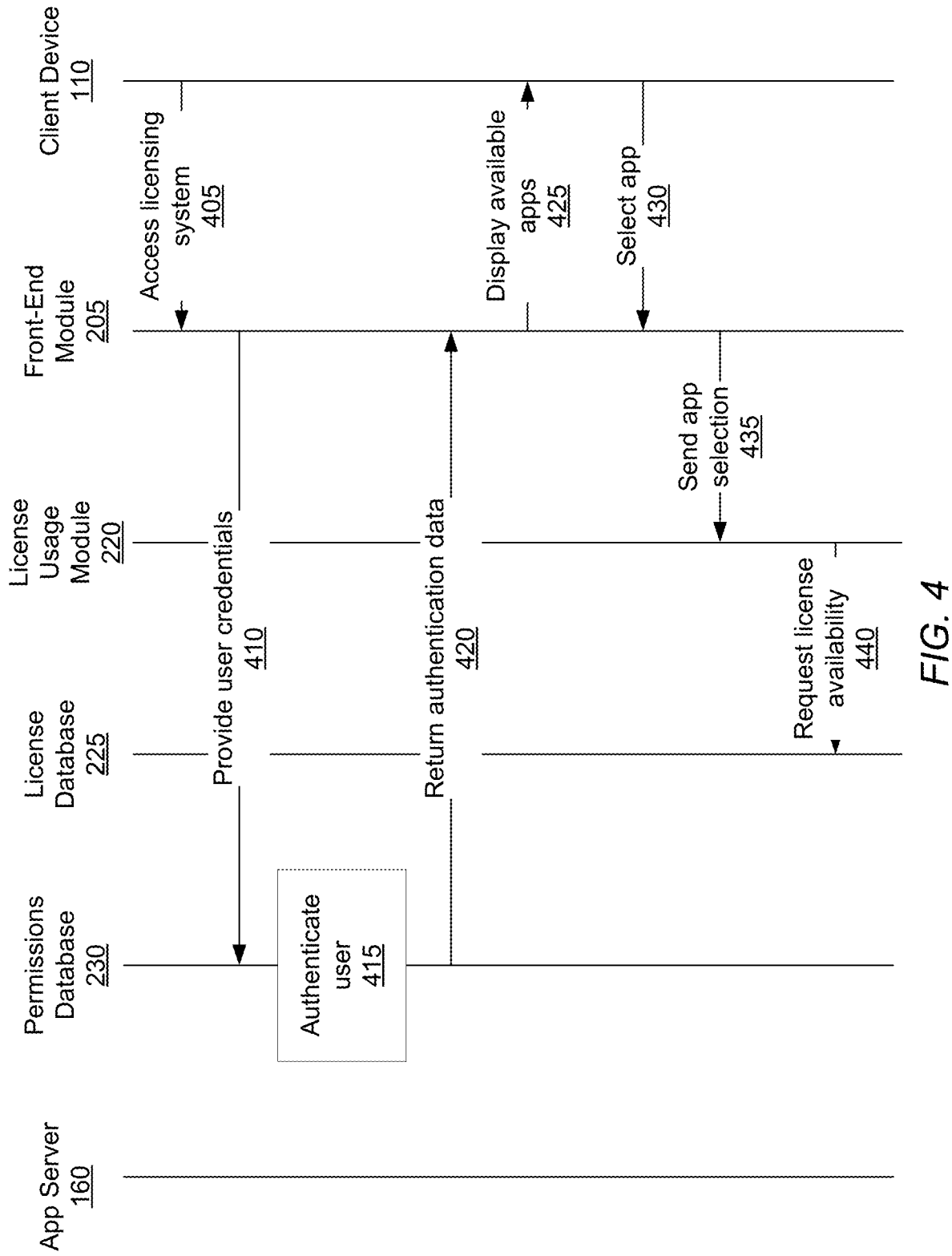
FIG. 4 is an interaction diagram illustrating a method for runtime usage of the application licensing system, according to one embodiment.
Figure 4:
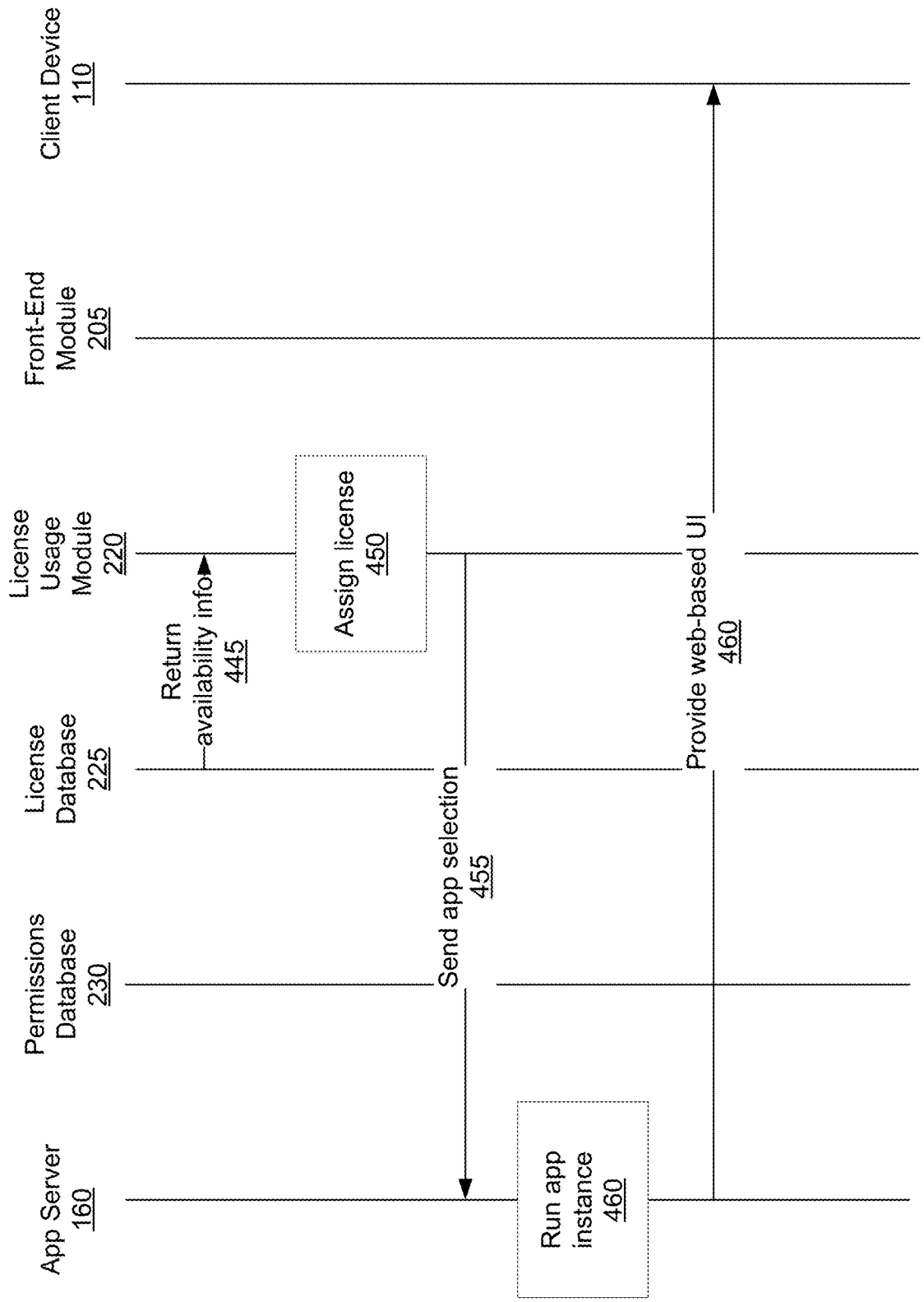

FIG. 4 illustrates a method 400 for application runtime usage, according to one embodiment. The steps of FIG. 4 are illustrated from the perspective of the license broker 150 performing the method 400. However, some or all of the steps may be performed by other entities or components. In addition, some embodiments may perform the steps in parallel, perform the steps in different orders, or perform different steps.

At 405, a user of a client device 110 accesses the application licensing system 140. The user supplies his or her account credentials to the front-end module 205, and the front-end module 205 sends 410 the input credentials to the permissions database 230 to verify that the user is an authorized user of the application licensing system 140. In one embodiment, the account credentials include the user's name/password, an identifier of the user's account, and/or an identification of the organization with which the user is associated. The permissions database 230 authenticates 415 the user by checking that the account is valid and current, that the user has provided correct password credentials, that the user is associated with one or more license pools 170, and/or that the user has the rights to use one or more applications associated with the application licensing system 140. In some embodiments, the permissions database 230 further determines whether one or more restrictions or parameters limit the user's ability to access a licensed application. For example, the user's organization might determine that the user works on a particular project on Tuesdays and Thursdays and may thus allow the user to access a project-specific application on those days, but not on other days. As a further example, a user might be permitted to access a first component (e.g., a plug-in) of an application but not other components of the application. The permissions database 230 stores such restrictions and returns 420 the restrictions and authentication data to the front-end module 205.

At 425, the front-end module 205 displays a list of available applications that the user's license pool 170 and any application-specific restrictions allow the user to access. A web-based user interface displayed on a browser of the client device 110 includes, for each available license, a license type, a number of available licenses, a number of unavailable licenses (i.e., licenses that are currently in use by other users), and a total number of licenses. The user selects 430 an application from the list of the available applications, and the front-end module 205 sends 435 the application selection to the license usage module 220. At 440, the license usage module 220 queries the license database 225 to determine whether a license for the application is available for use by the requesting user. The license database 225 determines current uses of licenses for the requested application and returns 445 the availability information to the license usage module 220. If no licenses are available for use by the user (e.g., the licenses are all in use by other users of the license pool 170 or the license has been revoked or has expired), the license usage module 220 notifies the user. In some embodiments, the license usage module 220 may periodically query the license database 225 to determine whether a license for the requested application has become available (e.g., if another user surrenders a license).

If a license is available for the requested application, the license usage module 220 assigns 450 the license to the user and updates the available license count in the permissions database 230 to reflect the in-use license. The application selection is sent 455 to the license server 160 associated with the application, and the license server 160 runs 460 an instance of the requested application in a virtual machine and provides 465 a web-based user interface for the application to the user through the client device 110. For applications that verify the requested usage of the application at application run time, the application sends the stored license key to the application vendor 130 to verify that the stored license key matches the license key stored by the application vendor 130. When the user closes the application interface or otherwise surrenders the license, the license usage module 220 instructs the license server 160 to stop running the instance of the application and updates the license count in the license database 225 to reflect the availability of the license previously used by the user.

Computing System Architecture

Figure 5:
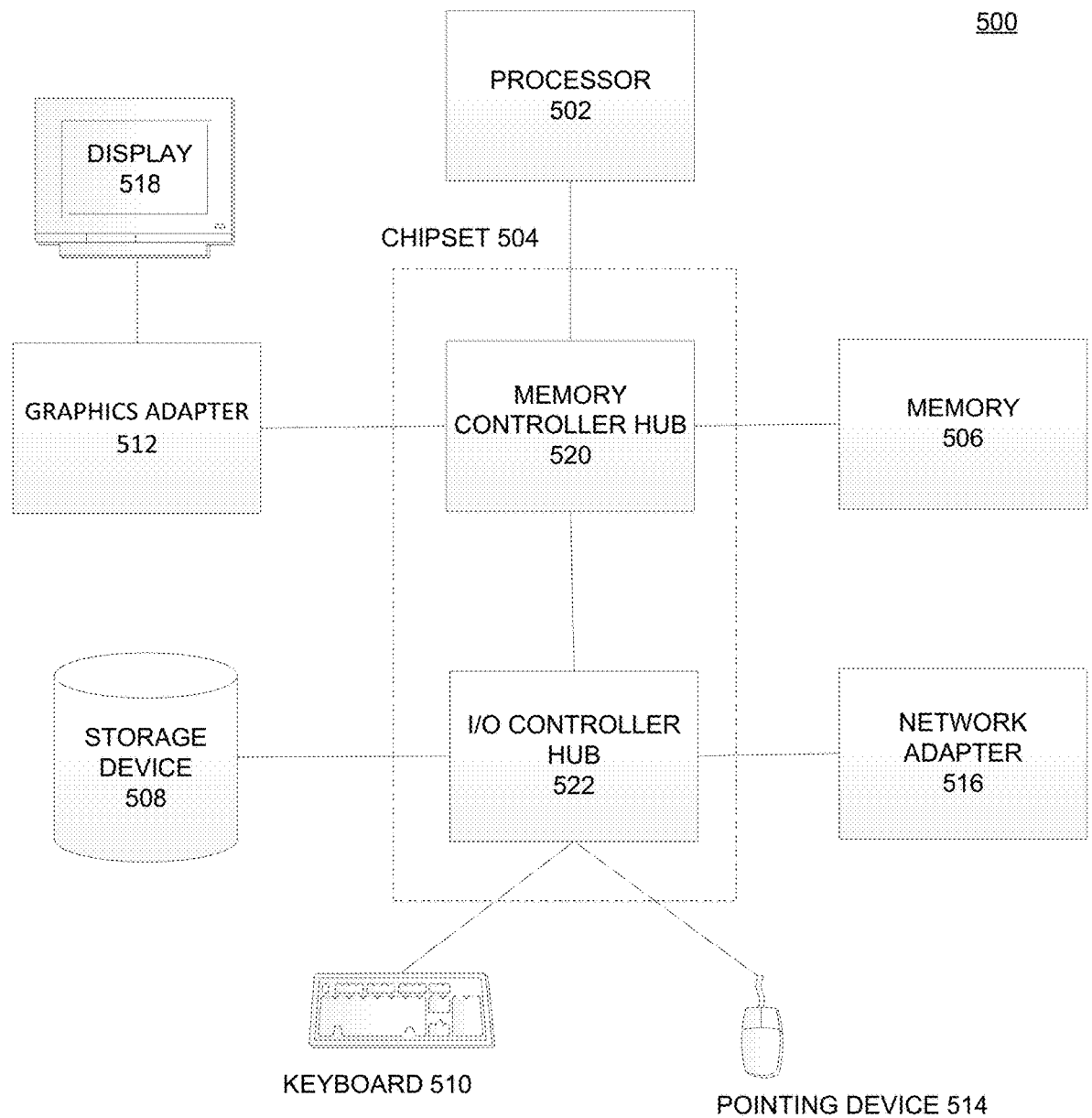
FIG. 5 is a block diagram illustrating an example of a computer suitable for use in the system environment of FIG. 1, according to one embodiment.

FIG. 5 is a high-level block diagram illustrating an example computer 500 suitable for use as part or all of the application licensing system 140, the application vendor 130, or the client device 110. The example computer 500 includes at least one processor 502 coupled to a chipset 504. The chipset 504 includes a memory controller hub 520 and an input/output (I/O) controller hub 522. A memory 506 and a graphics adapter 512 are coupled to the memory controller hub 520, and a display 518 is coupled to the graphics adapter 512. A storage device 508, keyboard 510, pointing device 514, and network adapter 516 are coupled to the I/O controller hub 522. Other embodiments of the computer 500 have different architectures.

In the embodiment shown in FIG. 5, the storage device 508 is a non-transitory computer-readable storage medium such as a hard drive, compact disk read-only memory (CD-ROM), DVD, or a solid-state memory device. The memory 506 holds instructions and data used by the processor 502. The pointing device 514 is a mouse, track ball, touch-screen, or other type of pointing device, and is used in combination with the keyboard 510 (which may be an on-screen keyboard) to input data into the computer system 500. The graphics adapter 512 displays images and other information on the display 518. The network adapter 516 couples the computer system 500 to one or more computer networks.

As is known in the art, a computer 500 can have different and/or other components than those shown in FIG. 5. In addition, the computer 500 can lack certain illustrated components. In one embodiment, a computer 500, such as a host or smartphone, may lack a graphics adapter 512, and/or display 518, as well as a keyboard 510 or external pointing device 514. Moreover, the storage device 508 can be local and/or remote from the computer 500 (such as embodied within a storage area network (SAN)).

As is known in the art, the computer 500 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 508, loaded into the memory 506, and executed by the processor 502.

ADDITIONAL CONSIDERATIONS

The disclosure describes embodiments in which the application licensing system 140 onboards and manages cloud-based licensing of applications for use by members of an organization (e.g., employees of a company). One of skill in the art will recognize that the described systems and methods may also be employed for licenses used by individual independent users and in instances where users rent time with an application for which they do not otherwise possess a license.

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for cloud-based application licensing. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed. The scope of protection should be limited only by the following claims.

The invention claimed is:

1. A computer-implemented method performed by a server, the computer-implemented method comprising:
    receiving, by a front-end module of the server, from each organization of a plurality of organizations, a set of application licenses for use of applications;
    storing, by an onboarding module, in a license database of the server, the application licenses in association with the organizations;
    receiving, by a permissions module of the server from the front-end module, user credentials of a user;
    verifying, by the permissions module, the user credentials;
    determining, by the permissions module, the user credentials identify the user as being associated with a first organization of the organizations;
    receiving, by the front-end module from a client device via a web-based user interface, a selection of a first one of the applications;
    sending, by the front-end module to a license usage module of the server, the selection of the first one of the applications;
    receiving, by the license usage module from the front-end module, the selection of the first one of the applications;
    querying, by the license usage module, the license database;
    identifying, by the license database, other uses of the first one of the applications by other users of the first organization;
    returning, by the license database to the license usage module, information about the other uses of the first one of the applications by other users of the first organization;
    determining, by the license usage module based at least in part on the other uses, that the set of application licenses of the organization permits the selection of the first one of the applications; and
    responsive to determining, by the license usage module, that the set of application licenses of the organization permits the selection of the first one of the applications, running, by a license server, an instance of the first one of the applications in a virtual machine.

2. The computer-implemented method of claim 1, further comprising updating an available license count for the first one of the applications to reflect the running of the instance.

3. The computer-implemented method of claim 2, further comprising:
    determining that the user has surrendered a license for the first one of the applications; and
    updating the available license count for the first one of the applications to include the surrendered license.

4. The computer-implemented method of claim 1, further comprising querying an application vendor to authenticate the selection of the first one of the applications, the querying comprising sending an application license for the first one of the applications to the application vendor.

5. The computer-implemented method of claim 1, wherein
determining that the set of application licenses of the organization permits the selection of the first one of the applications comprises determining that an application license for the first one of the applications is available for use by the user.

6. The computer-implemented method of claim 5, further comprising determining whether one or more restrictions limit use of the first one of the applications by the user and wherein, responsive to determining that one or more restrictions limit such use, running, by the license server, the instance of the first one of the applications in the virtual machine subject to the one or more restrictions.

7. The computer-implemented method of claim 1, further comprising:
   receiving, from an application vendor, a request to deactivate a stored license for the first one of the applications;
   deactivating the stored license from the set of application licenses of the first organization;
   after deactivating the stored license from the set of application licenses of the first organization, receiving, by the front-end module from the client device via the web-based user interface, another selection of the first one of the applications;
   determining that the set of application licenses of the first organization does not support the another selection of the first one of the applications; and
   sending a notification to the client device via the web-based user interface that the first one of the applications is not available for use by the user.

8. A non-transitory computer-readable storage medium storing instructions that, when executed by at least one processor, cause the at least one processor to perform the steps of:
   receiving, by a front-end module of a server, from each organization of a plurality of organizations, a set of application licenses for use of applications;
   storing, by an onboarding module, in a license database of the server, the application licenses in association with the organizations;
   receiving, by a permissions module of the server from the front-end module, user credentials of a user;
   verifying, by the permissions module, the user credentials;
   determining, by the permissions module, the user credentials identify the user as being associated with a first organization of the organizations;
   receiving, by the front-end module from a client device via a web-based user interface, a selection of a first one of the applications;
   sending, by the front-end module to a license usage module of the server, the selection of the first one of the applications;
   receiving, by the license usage module from the front-end module, the selection of the first one of the applications;
   querying, by the license usage module, the license database;
   identifying, by the license database, other uses of the first one of the applications by other users of the first organization;
   returning, by the license database to the license usage module, information about the other uses of the first one of the applications by other users of the first organization;
   determining, by the license usage module based at least in part on the other uses, that the set of application licenses of the organization permits the selection of the first one of the applications; and
   responsive to determining, by the license usage module, that the set of application licenses of the organization permits the selection of the first one of the applications, running, by a license server, an instance of the first one of the applications in a virtual machine.

9. The non-transitory computer-readable storage medium of claim 8, wherein the instructions comprise further instructions that, when executed by the at least one processor, further cause the at least one processor to perform the step of updating an available license count for the first one of the applications to reflect the running of the instance.

10. The non-transitory computer-readable storage medium of claim 9, wherein the instructions comprise further instructions that, when executed by the at least one processor, further cause the at least one processor to perform the steps of:
   determining that the user has surrendered a license for the first one of the applications; and
   updating the available license count for the first one of the applications to include the surrendered license.

11. The non-transitory computer-readable storage medium of claim 8, wherein the instructions comprise further instructions that, when executed by the at least one processor, further cause the at least one processor to perform the step of querying an application vendor to authenticate the selection of the first one of the applications, the query comprising sending an application license for the first one of the applications to the application vendor.

12. The non-transitory computer-readable storage medium of claim 8, wherein determining that the set of application licenses of the organization permits the selection of the first one of the applications comprises determining that an application license for the first one of the applications is available for use by the user.

13. The non-transitory computer-readable storage medium of claim 12, wherein the instructions comprise further instructions that, when executed by the at least one processor, further cause the at least one processor to perform the steps of determining whether one or more restrictions limit use of the first one of the applications by the user, and, responsive to determining that one or more restrictions limit such use, running, by the license server, the instance of the first one of the applications in the virtual machine subject to the one or more restrictions.

14. The non-transitory computer-readable storage medium of claim 8, wherein the instruction comprise further instructions that, when executed by the at least one processor, further cause the at least one processor to perform the steps of:
   receiving, from an application vendor, a request to deactivate a stored license for the first one of the applications;
   deactivating the stored license from the set of application licenses of the first organization;
   after deactivating the stored license from the set of application licenses of the first organization, receiving, by the front-end module from the client device via the web-based user interface, another selection of the first one of the applications;

determining that the set of application licenses of the first organization does not support the another selection of the first one of the applications; and sending a notification to the client device via the web-based user interface that the first one of the applications is not available for use by the user.

15. A computer system for providing cloud-based application licensing, comprising:

at least one processor; and a non-transitory computer-readable storage medium storing instructions that, when executed by the at least one processor, cause the at least one processor to perform the steps of:

receiving, by a front-end module of a server, from each organization of a plurality of organizations, a set of application licenses for use of applications;

storing, by an onboarding module, in a license database of the server, the application licenses in association with the organizations;

receiving, by a permissions module of the server from the front-end module, user credentials of a user;

verifying, by the permissions module, the user credentials;

determining, by the permissions module, the user credentials identify the user as being associated with a first organization of the organizations;

receiving, by the front-end module from a client device via a web-based user interface, a selection of a first one of the applications;

sending, by the front-end module to a license usage module of the server, the selection of the first one of the applications;

receiving, by the license usage module from the front-end module, the selection of the first one of the applications;

querying, by the license usage module, the license database;

identifying, by the license database, other uses of the first one of the applications by other users of the first organization;

returning, by the license database to the license usage module, information about the other uses of the first one of the applications by other users of the first organization;

determining, by the license usage module based at least in part on the other uses, that the set of application licenses of the organization permits the selection of the first one of the applications; and responsive to determining, by the license usage module, that the set of application licenses of the organization permits the selection of the first one of the applications, running, by a license server and for use by the user, an instance of the first one of the applications in a virtual machine.

16. The compute system of claim 15, wherein the instructions comprise further instructions that, when executed by the at least one processor, further cause the at least one processor to perform the step of updating an available license count for the first one of the applications responsive to running the instance of the first one of the applications.

17. The computer system of claim 15, wherein the instructions comprise further instructions that, when executed by the at least one processor, further cause the at least one processor to perform the step of querying an application vendor to authenticate the selection of the first one of the applications.

18. The computer system of claim 15, wherein determining that the set of application licenses of the organization permits the selection of the first one of the applications comprises determining that an application license for the first one of the applications is available for use by the user.

19. The computer system of claim 18, wherein the instructions comprise further instructions that, when executed by the at least one processor, further cause the at least one processor to perform the steps of determining whether one or more restrictions limit use of the first one of the applications by the user, and, responsive to determining that one or more restrictions limit such use, running, by the license server, the instance of the first one of the applications in the virtual machine subject to the one or more restrictions.

20. The computer system of claim 15, wherein the instructions comprise further instructions that, when executed by the at least one processor, further cause the at least one processor to perform the steps of:

receiving, from an application vendor, a request to deactivate a stored license for the first one of the applications;

deactivating the stored license from the set of application licenses of the first organization;

after deactivating the stored license from the set of application licenses of the first organization, receiving, by the front-end module from the client device via the web-based user interface, another selection of the first one of the applications;

determining that the set of application licenses of the first organization does not support the another selection of the first one of the applications; and sending a notification to the client device via the web-based user interface that the first one of the applications is not available for use by the user.

* * * * *